(12) United States Patent
Grandjean et al.

(10) Patent No.: US 7,358,477 B2
(45) Date of Patent: Apr. 15, 2008

(54) METHOD OF OPTIMIZATION OF MEASUREMENT TIME FOR OPTICAL MOUSE SENSOR

(75) Inventors: André Grandjean, Cressier (CH); Gil Afriat, Monument, CO (US); Lawrence Bieber, Colorado Springs, CO (US); Kevin Scott Buescher, Colorado Springs, CO (US); James Harold Lauffenburger, Colorado Springs, CO (US)

(73) Assignee: EM Microelectronic-Marin SA, Marin, SA ( * ) Notice: Subject to any disclaimer, the term of this patent is extended or adjusted under 35 U.S.C. 154(b) by 0 days.

(21) Appl. No.: 11/383,258

(22) Filed: May 15, 2006

(65) Prior Publication Data
US 2007/0262242 A1 Nov. 15, 2007

(51) Int. Cl.
*G01J 1/44* (2006.01)
*H01J 40/14* (2006.01)
*H03F 3/08* (2006.01)

(52) U.S. Cl. .............................................. 250/214 R

(58) Field of Classification Search ................ 250/221, 250/214 R; 345/157–161, 163–167
See application file for complete search history.

(56) References Cited

U.S. PATENT DOCUMENTS 4,068,222 A * 1/1978 Treviranus .................. 340/556
6,963,059 B2 11/2005 Lauffenburger et al.

* cited by examiner

*Primary Examiner*—Georgia Epps
*Assistant Examiner*—Suezu Ellis
(74) *Attorney, Agent, or Firm*—Griffin & Szipl, P.C.

(57) ABSTRACT

A method for operating an optical sensing device having a light source and a photodetector device with at least one photosensitive element. A surface portion is illuminated with radiation by the light source and the radiation reflected from the illuminated surface portion is detected with a photosensitive element. While said surface portion is being illuminated, an output signal of the photosensitive element over time is integrated, the output signal integration level is compared with a first integration reference level during integration; the integration step is interrupted if the output signal integration level has reached the first integration reference level, or the comparison step is repeated until a first integration period has elapsed if the output signal integration level has not reached the first integration reference level.

11 Claims, 7 Drawing Sheets

METHOD OF OPTIMIZATION OF MEASUREMENT TIME FOR OPTICAL MOUSE SENSOR

FIELD OF THE INVENTION

The present invention generally relates to optical sensing devices comprising a light source for illuminating a surface portion with radiation, a photodetector device having at least one photosensitive element responsive to radiation reflected from the illuminated surface portion and conversion means (or integrating means) for integrating an output signal of the said at least one photosensitive element over time during an integration period. Such optical sensing devices are particularly used in optical pointing devices such as mice, trackballs and other similar computer peripherals. The present invention also concerns a method for operating the above optical sensing device as well as an optical pointing device equipped with the above constituent parts of the optical sensing device.

BACKGROUND OF THE INVENTION

In order to extract motion-related information, a so-called "Edge Motion Detection" technique serves as a basis. This "Edge Motion Detection" technique essentially consists in a determination of the movement of edges (i.e. a difference between the intensity of pairs of pixels) in the image detected by the photodetector array. Edges are defined as spatial intensity differences between two pixels of the photodetector array. The relative motion of each of these edges is tracked and measured so as to determine an overall displacement measurement which is representative of the relative movement between the photodetector array and the illuminated portion of the surface.

In optical sensing devices, it is commonly known to couple a conversion circuit (or integration circuit) to each photosensitive element of the photodetector device so as to integrate the output signals of these photosensitive elements over time during a so-called integration period. FIG. 1 schematically shows the general principle of an integrating circuit, designated by reference numeral 1100, coupled to a photosensitive element, in this case a photodiode, designated by reference numeral 1000. This integrating circuit 1100 typically consists of an amplifier 1110 and a capacitive element 1120 (or integration capacitor) connected between the output and the inverting input of the amplifier, the photosensitive element 1000 being connected to the inverting input of the amplifier while the non-inverting input of the amplifier is tied to a reference potential such as ground. The integrating circuit 1100 outputs a voltage signal Vout, or integrated signal, which varies over time and which is in essence the result of the integration over time of the current signal iout produced by the photosensitive element 1000. Assuming that current iout has a substantially constant value during the period where integrating circuit is active (i.e. during the so-called integration period), the output voltage Vout will vary substantially linearly over time. In some cases, the integration period is set to have a fixed duration. In some other cases, however, the duration of the integration period may be variable.

Such optical pointing devices are already known in the art. U.S. Pat. No. 6,963,059, filed in the name of the same Assignee and which is incorporated in its entirety herein by reference, for instance discloses a method, and system for optimizing illumination power and integration time in an optical sensing device.

FIG. 2 illustrates the basic principle of U.S. Pat. No. 6,963,059. It basically consists of an optical sensing system comprising a light source 10 for illuminating a portion of a surface S with radiation, a photodetector device 20 having at least one photosensitive element responsive to radiation reflected from the illuminated surface portion S, conversion means 30, coupled to the output of the photodetector device 20, for integrating an output signal of the said at least one photosensitive element over time during an integration period of variable duration and a regulating system 40 for controlling the power of the light source as a function of the duration of the integration period. It should be stressed that the optical sensing system is designed, so that the integration period has a variable duration, designated Tint, which depends on the power of the light source 10 and the level of radiation reflected from the illuminated surface portion S. It will thus be appreciated that the optical sensing system of FIG. 2 includes some sort of feedback loop for enslaving the power of the light source 10 as a function of the evolution of the integration. The regulating system 40 is used to control (i.e. adjust if necessary) the power of the light source so that the duration of the integration period remains, under normal conditions, in the vicinity of at least one reference duration value. As schematically illustrated in the example of FIG. 2, three reference values designated Tmin, Tmax and Ttimeout may be used.

These optical pointing devices are more and more cordless devices, i.e. battery powered, and used on a wide variety of surfaces. Thus, for these optical pointing devices two very important features are surface coverage and tracking quality along with battery life. Darker surfaces require more light and thus a longer amount of integration time or a more powerful light source to recover the same amount of light energy as lighter surfaces. This longer integration time of the recovered light or this more powerful light source respectively causes the supported speed of motion to drop proportionally or the power consumption to increase proportionally. One way to optimize this behaviour is to stop the integration of light sooner on dark surfaces. Unfortunately this also decreases the signal to noise ratio (SNR) generally resulting in poorer tracking.

SUMMARY OF THE INVENTION

One goal of the present invention is thus to implement an integration stop control algorithm in the way of a reliable method for operating an optical motion sensing device in order to optimize the trade-off between tracking speed (linked to the integration time) and tracking quality (linked to the signal to noise ratio) on light and dark surfaces. This allows a better signal to noise ratio on lighter surfaces and faster supported tracking speeds on darker surfaces.

For that purpose, the invention concerns a method for operating an optical sensing device having a light source and a photodetector device with at least one photosensitive element, said method comprising the steps of:

(i) illuminating a surface portion with radiation by means of said light source;

(ii) detecting radiation reflected from the illuminated surface portion with said at least one photosensitive element;

(iii) while said surface portion is being illuminated, integrating an output signal of said at least one photosensitive element over time;

(iv) comparing the output signal integration level with a first integration reference level during integration;

(v) interrupting said integration step (iii) if said output signal integration level has reached said first integration reference level, or getting back to comparison step (iv) until a first integration period has elapsed if said output signal integration level has not reached said first integration reference level, and wherein said method further comprises the steps of:

(vi) comparing said output signal integration level with a second integration reference level smaller than said first integration reference level, after said first integration period has elapsed;

(vii) interrupting said integration step (iii), if said output signal integration level has reached at least said second integration reference level; and This operating mode efficiently solves complicated trade-offs between tracking speed and tracking quality by optimizing signal to noise ratio (SNR) for a given speed requirement.

Furthermore, other advantageous embodiments form the subject of the dependent claims.

BRIEF DESCRIPTION OF THE DRAWINGS

Other aspects, features and advantages of the present invention will be apparent upon reading the following detailed description of non-limiting examples and embodiments made with reference to the accompanying drawings.

DETAILED DESCRIPTION OF THE INVENTION

The following description concerns a method for operating an optical sensing device having a light source and a photodetector device with at least one photosensitive element having a determined gain, will be explained by way of a non limiting examples in relation with FIGS. 3 to 10.

First Embodiment

According to a first embodiment, the control algorithm or method of operating of the optical sensing device allows an initial high integration stop voltage or first integration reference level (SFmaxHighLevel). This mode is enabled by a specific register wherein the first integration reference level to be reached, is stored and is maintained as long as the integration time, is sufficiently short to support the max required tracking speed defined by the maximum flashing rate. This insures that the signal to noise ratio is maximized as long as the max required tracking speed may be supported (see FIG. 3).

If, at a predetermined programmable time or a first integration period (HighSFmaxTime), which advantageously equals to the max integration time that still supports the max required tracking speed, the integration level (SFmax) of the output signal of the photosensitive element has not met the first integration reference level, then this first integration reference level is reduced immediately to a lower second integration reference level (SFmaxLevel<SFmaxHighLevel), and preferably at least twice smaller than the first reference (SFmaxLevel=SFmaxHighLevel/2). Now, if at this point the output signal integration level (SFmax) has reached a level which is below SFmaxHighLevel and above SFmaxLevel, the integration will stop, allowing the sensor to achieve maximum signal to noise ratio within the framework of supporting the maximum required tracking speed (see FIG. 4). In other words, the sensor allows "medium-bright" surfaces to maximize the pixels signal to noise ratio within the framework of maximum flash rate.

If the current integration level is below the second integration reference level (SFmax<SFmaxLevel), the integration will continue until this lower integration reference level (SFmaxLevel) is reached. This allows the sensor to achieve a minimal required signal to noise ratio, while the supported speed is lower (see FIG. 5). Actually it is better to support a lower speed, but with a reasonable accuracy rather than supporting higher speed with an unacceptable accuracy. A timeout period may be provided to avoid "unlimited" integration time.

Figure 1:
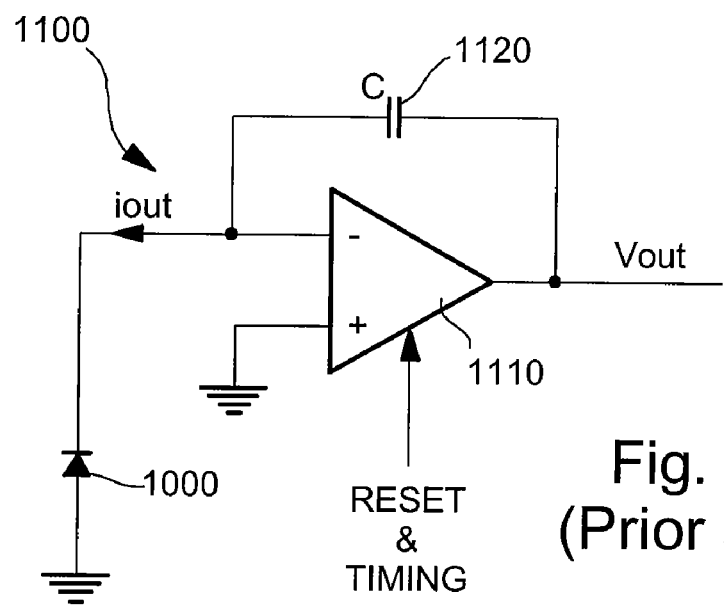
FIGS. 1 and 2, already described, are schematic illustrations of an optical motion sensing device according to the prior art.
Figure 2:
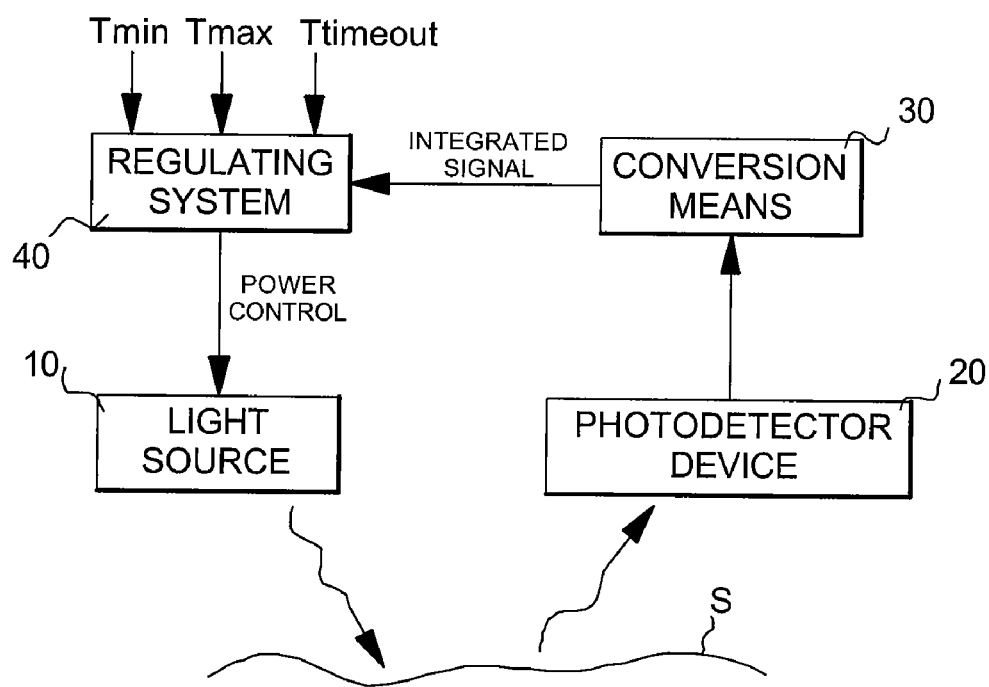
Figure 3:
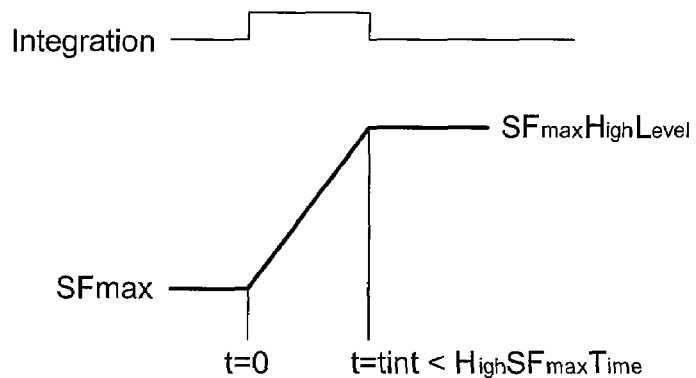
FIG. 3 is a schematic illustration of the integration level of one photosensitive element when reaching a first integration reference level.
Figure 4:
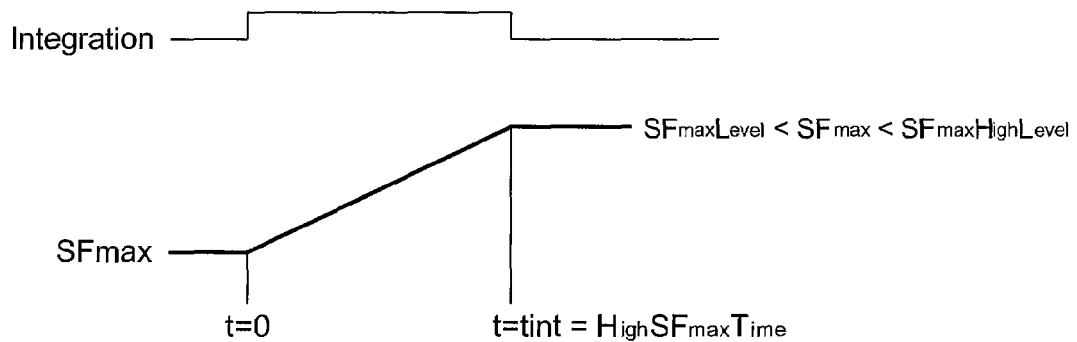
FIG. 4 is a schematic illustration of the integration level of one photosensitive element when reaching at least a second integration reference level.
Figure 5:
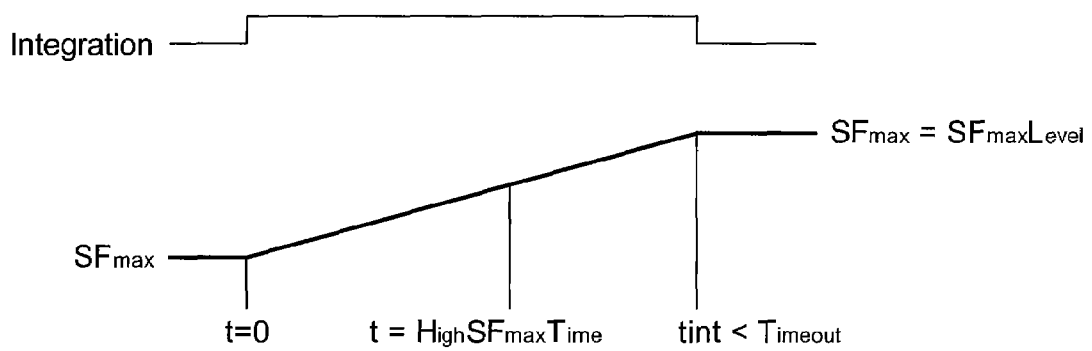
FIG. 5 is a schematic illustration of the integration level of one photosensitive element when reaching a second integration level after a predetermined integration time.
Figure 6:
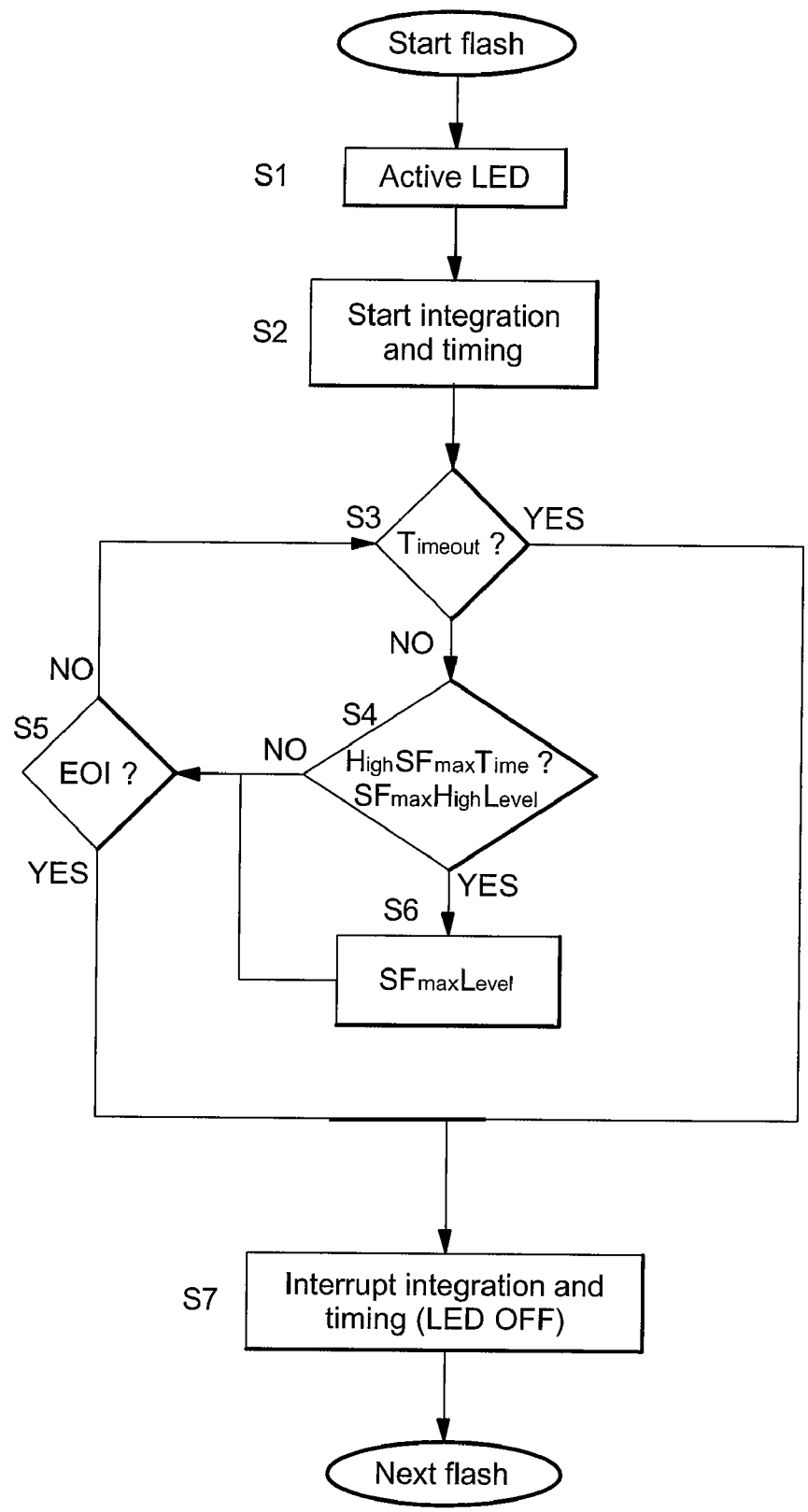
FIG. 6 is a flow chart illustrating a method for controlling operation of an optical sensing device according to a first embodiment of the invention.

Referring now to FIG. 6, it will be described in more detail the method for operating an optical sensing device according to this first embodiment. FIG. 6 shows a flowchart of operations which could be undertaken during each flash (or illumination period or activation period) of the optical sensing device. This flowchart is applicable in particular to the optical sensing device of FIG. 2.

Following the start of the flash, the first step S1 of FIG. 6 consists in activating the light source. Next, at step S2, integration of the output signal, i.e. integration level (SFmax), of the photodetector device starts as well as the timing operation of the duration of the integration period. For every flash, this integration is always made with consideration of the first integration reference level setting (SFmaxHighLevel) that may be stored in an associated register as already mentioned.

At step S3, it is optionally but preferably monitored whether the duration of the integration that is timed Tint reaches the timeout value (Ttimeout). In the affirmative, the process continues directly at step S7. In the negative or if step S3 is not implemented, the process continues at step S4 where it is checked whether the duration that is timed Tint reaches a first integration period (HighSFmaxTime). In the negative at step S4, the process continues at step S5 where it is checked whether the end of integration (E.O.I.) condition considering the first integration reference level has been detected (SFmax≧SFmaxHighLevel). If such end of integration condition is detected at step S5 then the process continues to step S7, otherwise it returns to step S3. In the affirmative at step S4, the process continues at step S6, where the integration reference level is switched from the first integration reference level (SFmaxHighLevel) to the second integration reference level being smaller than the first integration reference level (SFmaxLevel<SFmaxHighLevel). The value of this second integration reference level may be stored in another register. The process then continues at step S5 where it is checked whether the end of integration (E.O.I.) condition considering now also the second integration reference level has been detected (SFmaxLevel≦SFmax<SFmaxHighLevel). Similarly to step S5, if such end of integration condition is detected at step S6 then the process continues to step S7, otherwise it returns to step S3. At step S7, integration and timing operations are interrupted and the light source is deactivated until the next activation or flash.

It is to be noted that the flowchart of FIG. 6 is of course purely illustrative and shall not be considered as being a limitation of the scope of the invention.

Alternatively and advantageously to the first embodiment, additional features, that will be described hereinafter, may be implemented within the control algorithm or method of operating according to the invention.

Second Embodiment

Figure 7:
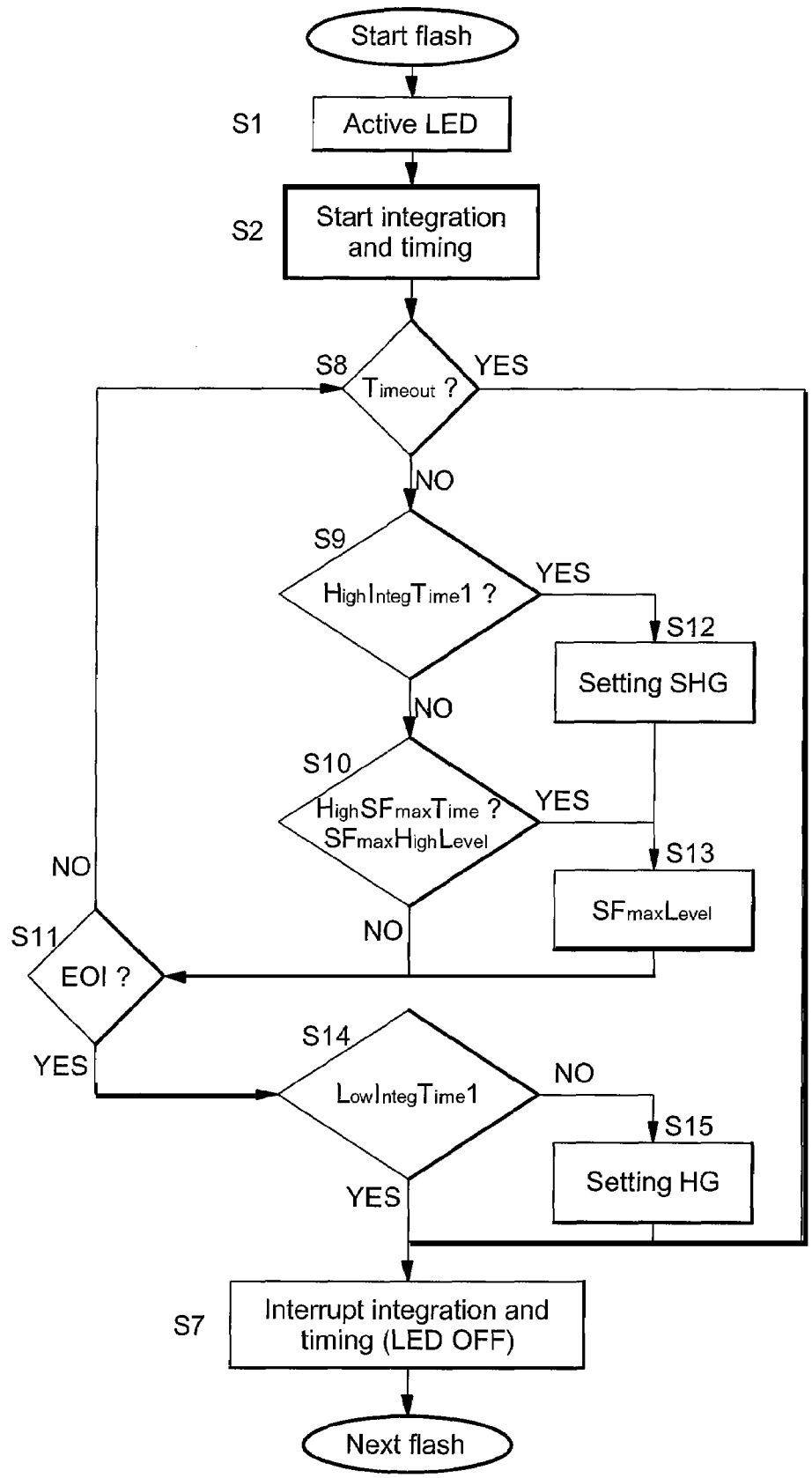
FIG. 7 represents a flow chart illustrating a method for controlling operation of an optical sensing device according to a second embodiment of the invention.
Figure 8:
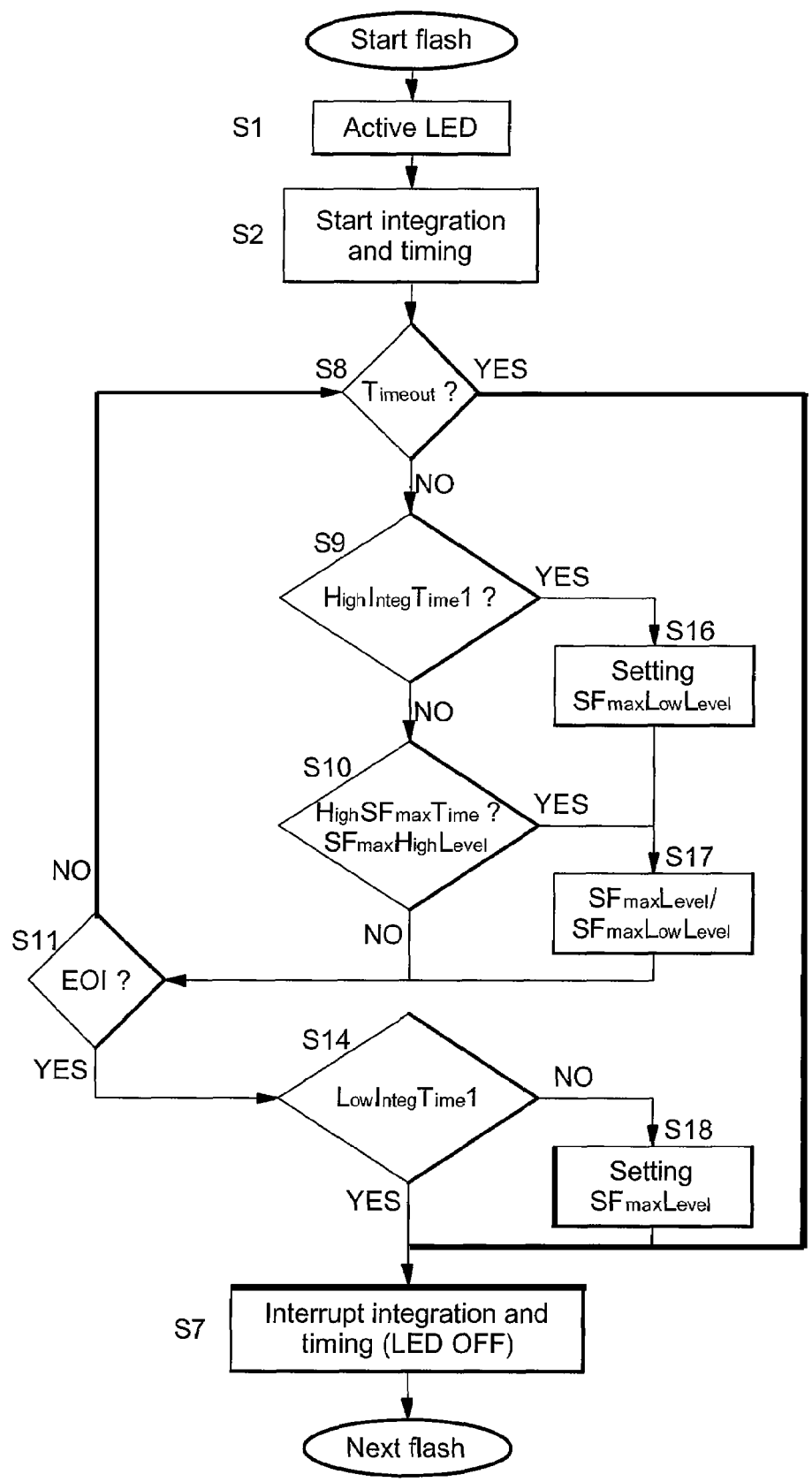
FIG. 8 represents a flow chart illustrating a method for controlling operation of an optical sensing device according to a third embodiment of the invention.
Figure 9:
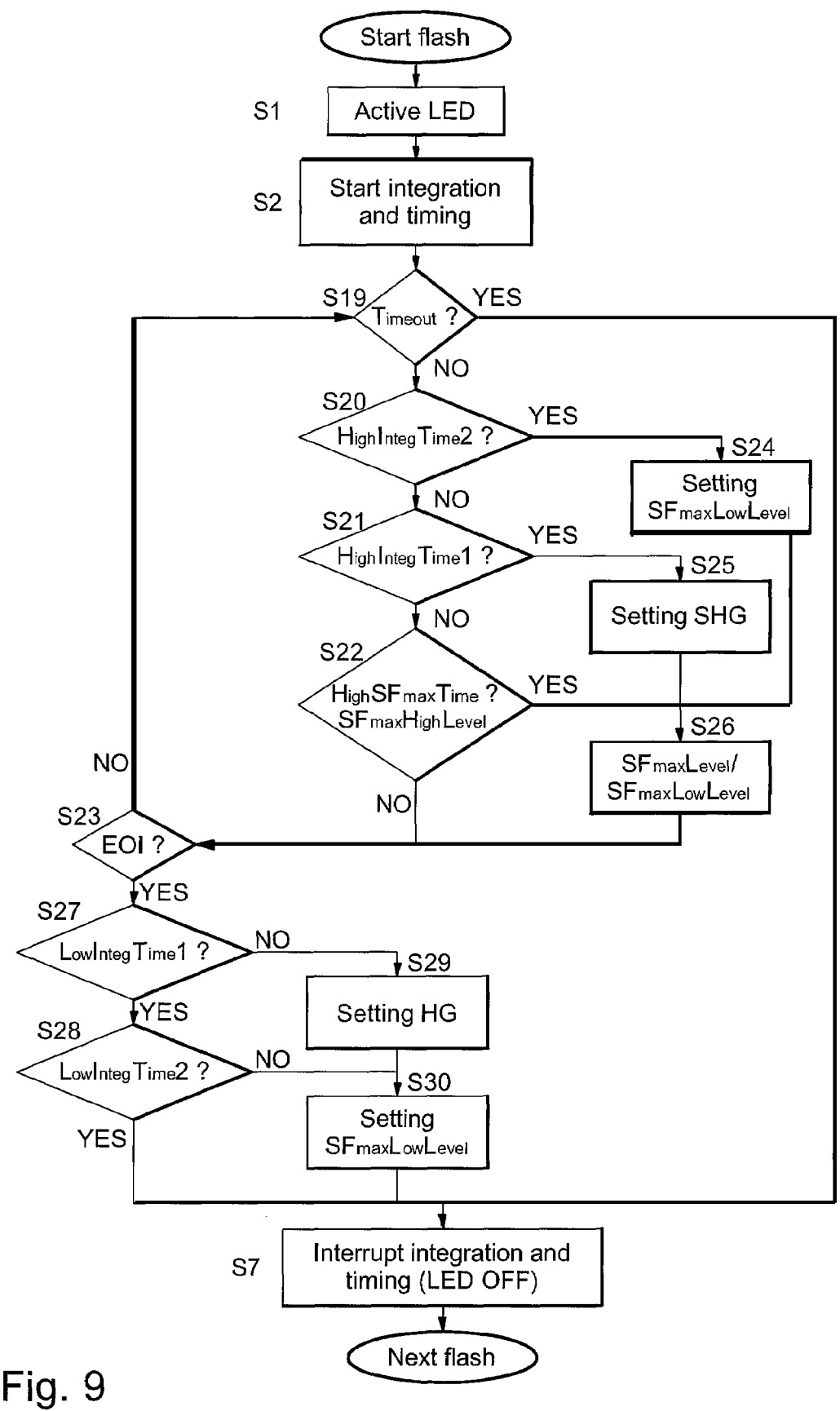
FIG. 9 represents a flow chart illustrating a method for controlling operation of an optical sensing device according to a fourth embodiment of the invention.
Figure 10:
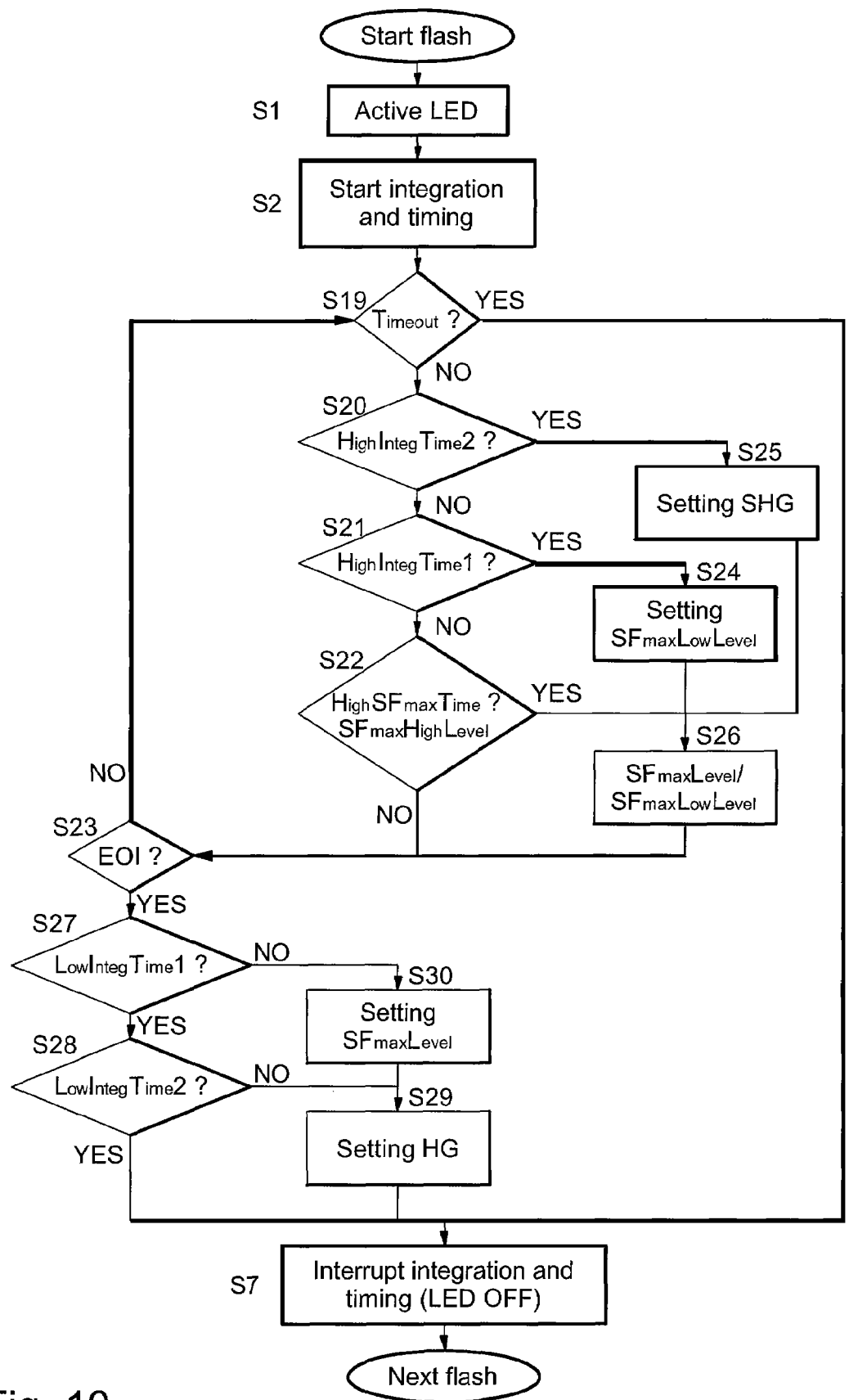
FIG. 10 represents a flow chart illustrating a method for controlling operation of an optical sensing device according to a fifth embodiment of the invention.

According to a second embodiment of the present invention described in relation with FIG. 7, one additional feature concerns the gain of the photosensitive elements or pixels of the photodetector device. In this particular mode of operation, the pixels are provided with a first gain value or high gain mode (HG) and a second gain value greater than the first one or super high gain mode (SHG). By default, a dedicated register may contain the first gain value (HG) and two other registers may be allocated to contain the first reference integration level (SFmaxHighLevel) and the second integration reference level (SFmaxLevel). For the operating method implementing this feature, the control algorithm switches the pixel gain to super high gain (SHG) for the next flash if the integration time exceeds a predetermined time (HighIntegTime1) defined in a register which super high gain will reduce the integration time by a factor determined by the ratio between both gain values (for example 2) but in the meantime will decrease the signal to noise ratio. This has the effect of increasing tracking speed at the expense of some tracking quality.

When this mode of operation is enabled the control algorithm steps S1 and S2 are performed, then steps coming after steps S1 and S2 and before step S7 will differ from the steps of the first embodiment. As steps S1, S2 and S7 remain the same for the whole description as for the first embodiment, they will not be disclosed in detail again. After step S2, the algorithm will go through steps S8 to S15, illustrated in FIG. 7. By default the gain value has been set to the first value (HG).

At step S8, it is optionally but preferably monitored whether the duration of the integration that is timed Tint reaches the timeout value (Ttimeout). In the affirmative, the process continues directly at step S7. In the negative or if step S8 is not implemented, the process continues at step S9 where it is checked whether the duration that is timed Tint reaches a second determined integration period (HighIntegTime1).

In the negative at step S9, the process continues at step S10 where it is checked whether the duration that is timed Tint reaches the first integration period shorter than the second one (HighSFmaxTime<HighIntegTime1). In the negative at step S10, the process continues at step S11 where it is checked whether the end of integration (E.O.I.) condition considering the first integration reference level has been detected (SFmax≧SFmaxHighLevel). In the affirmative at step S10, the process continues at step S13, where the integration reference level is switched from the first integration reference level (SFmaxHighLevel) to the second integration reference level (SFmaxLevel<SFmaxHighLevel). The process then continues at step S11 where it is checked whether the end of integration (E.O.I.) condition considering now also the second integration reference level has been detected (SFmaxLevel≦SFmax<SFmaxHighLevel).

In the affirmative at step S9, the process continues at step S12 where the pixel gain is set for the next flash to the second value SHG greater than HG, and preferably so that SHG>2×HG. After step S12, the process continues to step S13, already described. The SHG pixel gain value will then be used for the next flash.

Referring again to step S11, where it is checked whether the end of integration (E.O.I.) condition has been detected, considering either only the first integration reference level if directly coming from step S10 (HighSFmaxLevel≦SFmax) or also the second integration reference level if coming from step S13 (SFmaxLevel≦SFmax≦HighSFmaxLevel). If any of such end of integration condition is detected at step S11 then the process continues to step S14, otherwise it returns to step S8. At step S14, it is checked whether the duration that is timed Tint reaches a third determined integration period LowIntegTime1<HighIntegTime1, and defined in LowIntegTime1 register. Advantageously, it is chosen so that:

$$\text{LowIntegTime1} < \text{HighIntegTime1} * \text{HG/SHG}; \quad (1)$$

In the negative at step S14, the process continues at step S15, where the pixel gain is switched back from the second gain value SHG to the first gain value HG, the register value being adapted. The process then continues at step S7. Otherwise, in the affirmative at step S14, the process directly continues at step S7.

For implementing this feature, there are registers that control the switching of the feature. Preferably, care is taken with the register settings to prevent oscillation on a flash by flash basis between SHG and HG by an adequate selection of integration time ratio and pixel gain ratio (see formula 1).

The motivation behind this scheme is to enable a faster integration time (with SHG) on darker surfaces, where the integration time exceeds a value that is equivalent to some supported speed, on the account of lower signal to noise ratio and tracking quality. Since SHG shortens the integration time by 2 times if SHG=2*HG, LowIntegTime1 has to be at least 2 times shorter than HighIntegTime1. Otherwise, the pixels gain will keep on switching from HG to SHG and back for each flash.

Third Embodiment

According to a third embodiment of the invention, another additional feature concerns the use of three different integration reference levels. For this mode which is described in relation with FIG. 8, there are the two levels already described in relation with the first embodiment that is to say the high or first integration reference level (SFmaxHighLevel) and the second integration reference level (SFmaxLevel). When this operating mode is enabled the control algorithm will lower the SFmax target level (SFmaxLevel) to even a lower target stop level or third integration reference level (SFmaxLowLevel), which lower stop level is programmable, instead of enabling SHG as for the second embodiment. This also decreases the integration time at the expense of signal to noise ratio and dynamic range. By switching to SFmaxLowLevel, the integration time will be shortened on the account of a lower pixel signal levels, i.e. lower signal to noise ratio.

When this mode of operation is enabled steps S1 and S2 are performed, then the steps coming after steps S1 and S2 and before step S7 will only differ from the second embodiment in that steps S16, S17 and S18 respectively replace steps S12, S13 and S14.

Thus, in the affirmative at step S9, the process continues to step S16 instead of step S12. At step S16, the integration reference level is set for the next flash to a lower and third integration reference level (SFmaxLowLevel) instead of the second integration reference level, and then the process continues at step S17 still considering the integration reference level setting of the current flash that is to say either SFmaxLevel or SFmaxLowLevel according to the integration behaviour during the previous flash.

In the affirmative at step S10, the process continues to step S17 instead of step S13. At step S17 it is checked whether the lower integration reference level has been set during a previous flash to either SFmaxLevel or SFmaxLowLevel. If, it has been set to SFmaxLevel, then at step S11, it is checked whether the end of integration (E.O.I.) condition has been detected considering the first and second integration reference levels (SFmaxLevel≦SFmax≦SFmaxHighLevel). Alternatively, if it has been set to SFmaxLowLevel, then at step S11, it is checked whether the end of integration (E.O.I.) condition has been detected considering the first and third integration reference levels (SFmaxLowLevel≦SFmax≦SFmaxHighLevel).

At step S14, it is checked whether the duration that is timed Tint reaches a third determined integration period LowIntegTime1<HighIntegTime1, and defined in LowIntegTime1 register. Advantageously, it is chosen so that:

$$\text{LowIntegTime1} < \text{HighIntegTime1} * \text{SFmaxLowLevel} / \text{SFmaxLevel}; \quad (2)$$

In the negative at step S14, the process continues at step S18, instead of step S15. At step 18, the integration reference level is set back to the second integration reference level (SFmaxLevel), and then the process continues at step S7. Otherwise, in the affirmative at step S14, the process directly continues at step S7.

For implementing this feature, there are registers that control the switching of the feature. Preferably, care is taken with the register settings to prevent oscillation on a flash by flash basis between SFmaxLevel and SFmaxLowLevel by an adequate selection of integration time ratio and integration reference level ratio (see formula 2).

Since SFmaxLowLevel lowers the integration level to be reached by 2 if SFmaxLevel=2*SFmaxLowLevel, LowIntegTime1 has to be at least 2 times shorter than HighIntegTime1. Otherwise, the integration reference level will keep on switching from SFmaxLevel to SFmaxLowLevel and back for each flash.

Fourth Embodiment

According to a fourth embodiment of the invention, the operating mode allows a combination of the second and third embodiments described above. This fourth embodiment will be described in relation with FIG. 9. When this mode is enabled, there are three different integration reference levels with SFmaxHighLevel>SFmaxLevel>SFmaxLowLevel and two different gain values HighGain (HG) and SuperHighGain (SHG), with HG<SHG.

In this mode, the algorithm will first increase the pixel gain value from HG to SHG on a next flash, when the integration time exceeds a first programmed value. Then, if the integration time still exceeds another programmed value the SFMax target level is reduced as well from SFmaxLevel to SFmaxLowLevel. This allows the optical pointing device to maintain two different tracking speed points with the tracking quality possibly being reduced at each step. Again care must be used when setting the control registers to prevent unwanted flash to flash oscillations.

Practically, when this operating mode is enabled, steps S1 and S2 are performed and then the steps coming after steps S1 and S2 and before step S7 differ.

At step S19, it is optionally but preferably monitored whether the duration of the integration that is timed Tint reaches the timeout value (Ttimeout). In the affirmative, the process continues directly at step S7. In the negative or if step S19 is not implemented, the process continues at step S20 where it is checked whether the duration that is timed Tint reaches a fourth determined integration period HighIntegTime2>HighIntegTime1. By selecting HighIntegTime2>HighIntegTime1, one selects two points of integration time (equivalent to two points of supported speed), where the sensor switch in features that decrease the integration time on the account of signal to noise ratio and tracking quality.

In the negative at step S20, the process continues at step S21, where it is checked whether the duration that is timed Tint reaches the second determined integration period (HighIntegTime1). In the negative at step S21, the process continues at step S22 where it is checked whether the duration that is timed Tint reaches the first integration period (HighSFmaxTime<HighIntegTime1). In the negative at step S22, the process continues at step S23 where it is checked whether the end of integration (E.O.I.) condition considering the first integration reference level has been detected (SFmax≧SFmaxHighLevel). In the affirmative at step S22, the process continues at step S26. At step S26 it is checked whether the lower integration reference level has been set during a previous flash to either SFmaxLevel or SFmaxLowLevel. If, it has been set to SFmaxLevel, then at step S23, it is checked whether the end of integration (E.O.I.) condition has been detected considering the first and second integration reference levels (SFmaxLevel≦SFmax≦SFmaxHighLevel). Alternatively, if it has been set to SFmaxLowLevel, then at step S23, it is checked whether the end of integration (E.O.I.) condition has been detected considering the first and third integration reference levels (SFmaxLowLevel≦SFmax≦SFmaxHighLevel). In the affirmative at step S21, the process continues at step S25 where the pixel gain is set for the next flash to the second value SHG greater than HG, and preferably so that SHG>2× HG. After step S25, the process continues to step S26, already described. The SHG pixel gain value will then be used for the next flash.

In the affirmative at step S20, the process continues at step S24. At step S24, the integration reference level is set for the next flash to the lower and third integration reference level (SFmaxLowLevel) instead of the second integration reference level, and then the process continues at step S26 still considering the integration reference level setting of the current flash that is to say either SFmaxLevel or SFmaxLowLevel according to the integration behaviour during the previous flash.

Referring again to step S23, where it is checked whether the end of integration (E.O.I.) condition has been detected, considering either only the first integration reference level if directly coming from step S22 (HighSFmaxLevel≦SFmax) or if coming from step S26 also the second integration reference level (SFmaxLevel≦SFmax≦HighSFmaxLevel) or alternatively also the third integration reference level (SFmaxLowLevel≦SFmax≦HighSFmaxLevel) depending on the setting of the integration reference level between the second and the third one during the current flash. If any of such end of integration condition is detected at step S11 then the process continues to step S27, otherwise it returns to step S19.

At step S27, it is checked whether the duration that is timed Tint reaches a third determined integration period LowIntegTime1<HighIntegTime1. Advantageously, it is chosen so that:

$$\text{LowIntegTime1} < \text{HighIntegTime1} * \text{HG/SHG}; \quad (1)$$

In the affirmative at step S27, the process continues at step S28, where it is checked whether the duration that is timed Tint reaches a fifth determined integration period LowIntegTime2, and defined in LowIntegTime2 register. It is chosen so that:

$$\text{LowIntegTime1} < \text{LowIntegTime2} < \text{HighIntegTime2} \quad (3)$$

And advantageously it is chosen so that:

$$\text{LowIntegTime2} < \text{HighIntegTime2} * \text{SFmaxLowLevel}/\text{SFmaxLevel} \quad (4)$$

In the negative at step S28, the process continues at step S30, where the integration reference level is switched back from SFmaxLowLevel to SFmaxLevel. The process then continues at step S7. Otherwise, in the affirmative at step S28, the process directly continues at step S7.

In the negative at step S27, the process continues at step S29, where the pixel gain is switched back from SHG to HG. The process then continues at step S30 already described.

Fifth Embodiment

According to a fifth embodiment of the invention, it provides the same two additional features as for the fourth embodiment, with the difference of switching the SFmaxLowLevel first when integration time exceeds HighIntegTime1 and the pixel gain to the second value SHG when integration time exceeds HighIntegTime2. This allows a comparison between these two features and the best trade-off between tracking speed and quality can be chosen.

Practically, in this fifth mode, the process differs from the fourth mode in that steps S24 and S25 are shifted so that in the affirmative at step S20, the process continues at step S25 and then S26, while in the affirmative at step S21, the process continues at step S24 and then S26. The process in the fifth mode further differs from the process in the fourth mode in that steps S29 and S30 are also shifted. Thus, in the affirmative at step S27, the process continues first at step S30 and then at step S29, while in the affirmative at step S28, the process continues only at step 29.

It is to be noted that in the fifth mode the third and fifth integration periods, respectively LowIntegTime1 and LowIntegTime2, are advantageously chosen so that:

$$\text{LowIntegTime1} < \text{HighIntegTime1} * \text{SFmaxLowLevel}/\text{SFmaxLevel}; \quad (2)$$

$$\text{LowIntegTime2} < \text{HighIntegTime2} * \text{HG/SHG}; \quad (5)$$

Finally, it is to be noted, that all FIGS. 6 to 10 are purely illustrative and that various amendments may be brought to these embodiments only given by way of examples.

Rest Mode

According to any preceding embodiments, one will now describe how the optical sensing device may operate in rest mode. Rest mode is a condition where the sensor decides that the mouse is not moving. The way this is decided may be by looking at the flash rate, eventually controlled by a flash rate control algorithm, after each flash as taught for example in the U.S. patent application Ser. No. 11/011,164 in the name of the same Assignee and which is enclosed herewith by way of reference. When the sensing device is in rest mode, the sensor may use a specific integration reference level SFmaxRestLevel. If the flash rate is at a level which is equal to or below a level that is defined in a dedicated register called FlashRateRest then the sensor decides that the mouse is in rest ("rest mode"). Alternatively, if the flash rate is above that level the sensor decides that the mouse is moving ("motion mode") which was disclosed in relation with all Figures.

The motivation for a separate level in rest mode is that when the sensor is in rest, a longer integration time may be allowed. Thus, a higher integration reference level may be used at rest, which would lead to a better signal to noise ratio and less jitter, false reports etc. . . . However, one may implement all features disclosed with the motion mode within the rest mode as well.

Having described the invention with regard to certain specific embodiments, it is to be understood that these embodiments are not meant as limitations of the invention. Indeed, various modifications and/or adaptations may become apparent to those skilled in the art without departing from the scope of the annexed claims. For instance, the proposed embodiments are not necessarily limited to the features above described.

What is claimed is:

1. A method for operating an optical sensing device having a light source and a photodetector device with at least one photosensitive element, said method comprising the steps of:

(f1_i) illuminating a surface portion with radiation by means of said light source;

(f1_ii) detecting radiation reflected from the illuminated surface portion with said at least one photosensitive element;

(f1_iii) while said surface portion is being illuminated, integrating an output signal of said at least one photosensitive element over time;

(f1_iv) comparing the output signal integration level with a first integration reference level during integration;

(f1_v) interrupting said integration step (f1_iii) if said output signal integration level has reached said first integration reference level, or getting back to comparison step (f1_iv) until a first integration period has elapsed if said output signal integration level has not reached said first integration reference level, and wherein said method further comprises the steps of:

(f1_vi) comparing said output signal integration level with a second integration reference level smaller than said first integration reference level, after said first integration period has elapsed;

(f1_vii) interrupting said integration step (f1_iii), if said output signal integration level has reached at least said second integration reference level.

2. The method according to claim 1, wherein it further comprises the steps of:

(f1_viii) further integrating said output signal of said at least one photosensitive element over time if said output signal integration level has not reached said second integration reference level after said first integration period until either said output signal integration level reaches said second integration reference level or integration reaches a timeout.

3. The method according to claim 1, wherein said at least one photosensitive element has a determined gain being set to a first gain value, said method further comprises the steps of:

(f1_ix) setting said determined gain to a second gain value greater than said first gain value for the next illumination, if said output signal integration level has not reached said second integration reference level after a second integration period, longer than the first integration period, has elapsed.

4. The method according to claim 3, for which said determined gain has been set to said second gain value, during the next illumination the method comprises the steps of:

(f2_i) illuminating said surface portion with radiation by means of said light source;

(f2_ii) detecting radiation reflected from the illuminated surface portion with said at least one photosensitive element;

(f2_iii) while said surface portion is being illuminated, integrating an output signal of said at least one photosensitive element over time;

(f2_iv) comparing the output signal integration level with said second integration reference level during integration;

(f2_v) both interrupting said integration step (f2_iii) and setting back said determined gain to said first gain value for the next illumination, if said output signal integration level has reached said second integration reference level during a third integration period shorter than said second integration period weighted by a ratio between said first and second gain values.

5. The method according to claim 4, further comprising the steps of:

(f1_x) setting a third integration reference level lower than the second integration reference level for the next illumination, if said output signal integration level has not reached said second integration reference level after a fourth integration period, longer than the second integration period, has elapsed.

6. The method according to claim 5, for which the third integration reference signal has been set instead of the second integration reference level, during the next illumination the method further comprising the steps of:

(f2_i) illuminating said surface portion with radiation by means of said light source;

(f2_ii) detecting radiation reflected from the illuminated surface portion with said at least one photosensitive element;

(f2_iii) while said surface portion is being illuminated, integrating an output signal of said at least one photosensitive element over time;

(f2_iv) comparing the output signal integration level with said third integration reference level during integration;

(f2_vi) both interrupting said integration step (f2_iii) and setting back said output signal integration level to said second integration reference level for the next illumination, if said output signal integration level has reached said third integration reference level during a fifth integration period shorter than said fourth integration period weighted by a ratio between said second and third reference levels.

7. The method according to claim 1, wherein the method further comprises the steps of:

(f1_xi) setting a third integration reference level lower than the second integration reference level for the next illumination, if said output signal integration level has not reached said second integration reference level after a second integration period, longer than the first integration period, has elapsed.

8. The method according to claim 7, for which the third integration reference level has been set instead of the second integration reference level, during the next illumination the method further comprising the steps of:

(f2_i) illuminating said surface portion with radiation by means of said light source;

(f2_ii) detecting radiation reflected from the illuminated surface portion with said at least one photosensitive element;

(f2_iii) while said surface portion is being illuminated, integrating an output signal of said at least one photosensitive element over time;

(f2_iv) comparing the output signal integration level with said third integration reference level during integration;

(f2_vii) both interrupting said integration step (f2_iii) and setting back said output signal integration level to said second integration reference level for the next illumination, if said output signal integration level has reached said third integration reference level during a third integration period shorter than said second integration period weighted by a ratio between said second and third reference levels.

9. The method according to claim 8, wherein said at least one photosensitive element has a determined gain being set to a first gain value, the method further comprising the steps of:

(f1_xii) setting said determined gain to a second gain value greater than said first gain value for the next illumination, if said output signal integration level has not reached said third integration reference level after that a fourth integration period, longer than the second integration period, has elapsed.

10. The method according to claim 9, for which said determined gain has been set to said second gain value, during the next illumination the method comprises the steps of:

(f2_i) illuminating said surface portion with radiation by means of said light source;

(f2_ii) detecting radiation reflected from the illuminated surface portion with said at least one photosensitive element;

(f2_iii) while said surface portion is being illuminated, integrating an output signal of said at least one photosensitive element over time;

(f2_iv) comparing the output signal integration level with said second integration reference level during integration;

(f2_viii) both interrupting said integration step (f2_iii) and setting back said determined gain to said first gain value for the next illumination, if said output signal integration level has reached said second integration reference level during a fifth integration period shorter than said fourth integration period weighted by a ratio between said first and second gain values.

11. The method according to claim 1, wherein it further comprises the steps of detecting whether a flash rate level of the light source is under a flash rate rest level, and setting a rest integration reference level greater than the first integration reference level as a new integration reference level for the next illumination.

* * * * *